(12) United States Patent
Li

(10) Patent No.: US 6,795,433 B1
(45) Date of Patent: Sep. 21, 2004

(54) MULTICAST ROUTING CACHE

(75) Inventor: Yunzhou Li, Lowell, MA (US)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/422,702

(22) Filed: Oct. 21, 1999

(51) Int. Cl.[7] .......................... H04L 12/28; H04L 12/56
(52) U.S. Cl. ....................................... 370/389; 370/392
(58) Field of Search ................................ 370/389, 390, 370/392, 431, 432, 464, 465, 471, 393

(56) References Cited

U.S. PATENT DOCUMENTS

| | | | | |
|---|---|---|---|---|
| 5,079,767 A | * | 1/1992 | Perlman | 370/408 |
| 5,917,820 A | * | 6/1999 | Rekhter | 370/392 |
| 6,078,590 A | * | 6/2000 | Farinacci et al. | 370/432 |
| 6,321,270 B1 | * | 11/2001 | Crawley | 709/238 |
| 6,331,983 B1 | * | 12/2001 | Haggerty et al. | 370/400 |
| 6,353,596 B1 | * | 3/2002 | Grossglauser et al. | 370/256 |
| 6,374,303 B1 | * | 4/2002 | Armitage et al. | 709/242 |
| 6,411,616 B1 | * | 6/2002 | Donahue et al. | 370/352 |
| 2003/0165140 A1 | * | 9/2003 | Tang et al. | 370/393 |

OTHER PUBLICATIONS

RFC 1584, Multicast Extensions to OSPF, Mar. 1994.

* cited by examiner

*Primary Examiner*—Ajit Patel
*Assistant Examiner*—Chirag Shah
(74) *Attorney, Agent, or Firm*—Steubing McGuiness & Manaras LLP

(57) ABSTRACT

A method of processing a multicast packet that includes determining whether a first forwarding cache that stores forwarding information for ranges of addresses includes a cache entry covering the source address, and, if the first forwarding cache includes the such an entry, adding an entry to a second forwarding cache for the specific source address and group of the packet using the forwarding information associated with the first cache entry.

20 Claims, 14 Drawing Sheets

MULTICAST ROUTING CACHE

BACKGROUND OF THE INVENTION

Networks enable computers to quickly send e-mail, video, audio, and other electronic information to other computers very far away. Typically, the information is transmitted in packets. A packet is like an envelope with a return address (the packet source) and a mailing address (the packet destination). Much as an envelope reaches its mailing address via a series of post offices, a packet reaches its destination by winding its way through different computers in the network. One type of network computer is known as a router. When a router receives a network packet, the router typically tries to figure out how to forward the packet to its destination in the least amount of time.

Instead of addressing packets to a single destination, a packet may be addressed to a group. The packet is sent to each member of the group even though the different members may be very far apart from one another. This is known as "multicasting." A number of different approaches to multicasting are known. Some of these approaches have been embodied in multicasting protocols such as MOSPF (Multicast Open Short Path First), DVMRP (Distance Vector Multicast Router Protocol), and PIM-DM (Protocol Independent Multicasting Dense Mode). A router executing one of these protocols agrees to interact with other routers and forward packets in the manner described by the protocol.

SUMMARY OF THE INVENTION

In general, in one aspect, the invention features a method of processing a multicast packet being sent from a multicast source address to members of a multicast group. The method includes determining whether a first forwarding cache that stores forwarding information for ranges of addresses includes a first forwarding cache entry for a range of addresses that includes the source address. If the first forwarding cache includes the first forwarding cache entry, adding an entry to a second forwarding cache for the specific source address and group of the packet using the forwarding information associated with the first forwarding cache entry.

Embodiments may include one or more of the following features. The method may further include adding an entry in the first forwarding cache for a range of addresses that includes the source address of the packet. Adding such an entry may include using a multicast protocol routing algorithm, such as MOSPF, DVMRP, or PIM-DM, to determine forwarding information for the range of address. Adding the entry may include determining a range of source addresses in table of multicast source addresses that include the source address of the packet. The range of source addresses may be a most specific range of source addresses including the source address of the packet. The forwarding information may include identification of one or more incoming interfaces and one or more outgoing interfaces.

The method of claim 1 may further include determining whether a second forwarding cache entry exists for the source address and group of the packet in the second forwarding cache. If the second forwarding entry exists, the method may include forwarding the packet in accordance with the forwarding information of the second forwarding entry. The address ranges may be nested address ranges.

In general, in another aspect, a method of updating a first entry in a first forwarding cache that stores forwarding information for multicast source address, multicast group pairs, can include selecting a first entry in a second forwarding cache that stores forwarding information for ranges of multicast source addresses, the range of addresses of the selected second entry including the multicast source address, and replacing the forwarding information for the first entry in the first forwarding cache with forwarding information associated with the selected second entry in the second forwarding cache.

In general, in another aspect, the invention features a memory storing one or more data structures for use in routing multicast network packets from a source to a multicast group. The memory includes a forwarding cache that stores forwarding information for particular source/group pair and a protocol forwarding cache that stores forwarding information for nested ranges of source addresses.

In general, in another aspect, the invention features a computer program product, disposed on a computer readable medium, for processing a multicast packet being sent from a multicast source address to members of a multicast group. The program includes instructions for causing a processor to determine whether a first forwarding cache that stores forwarding information for ranges of addresses includes a first forwarding cache entry for a range of addresses that includes the source address. If the first forwarding cache includes the first forwarding cache entry, the method can add an entry to a second forwarding cache for the specific source address and group of the packet using the forwarding information associated with the first forwarding cache entry.

In general, in another aspect, the invention features A computer program product, disposed on a computer readable medium, for updating a first entry in a first forwarding cache that stores forwarding information for multicast source address, multicast group pairs. The program includes instructions for causing a processor to select a first entry in a second forwarding cache that stores forwarding information for ranges of multicast source addresses, the range of addresses of the selected second entry including the multicast source address. The program also includes instructions that replace the forwarding information for the first entry in the first forwarding cache with forwarding information associated with the selected second entry in the second forwarding cache.

Advantages of the invention will become apparent in view of the following description, including the figures, and the claims.

DETAILED DESCRIPTION

Figure 1:
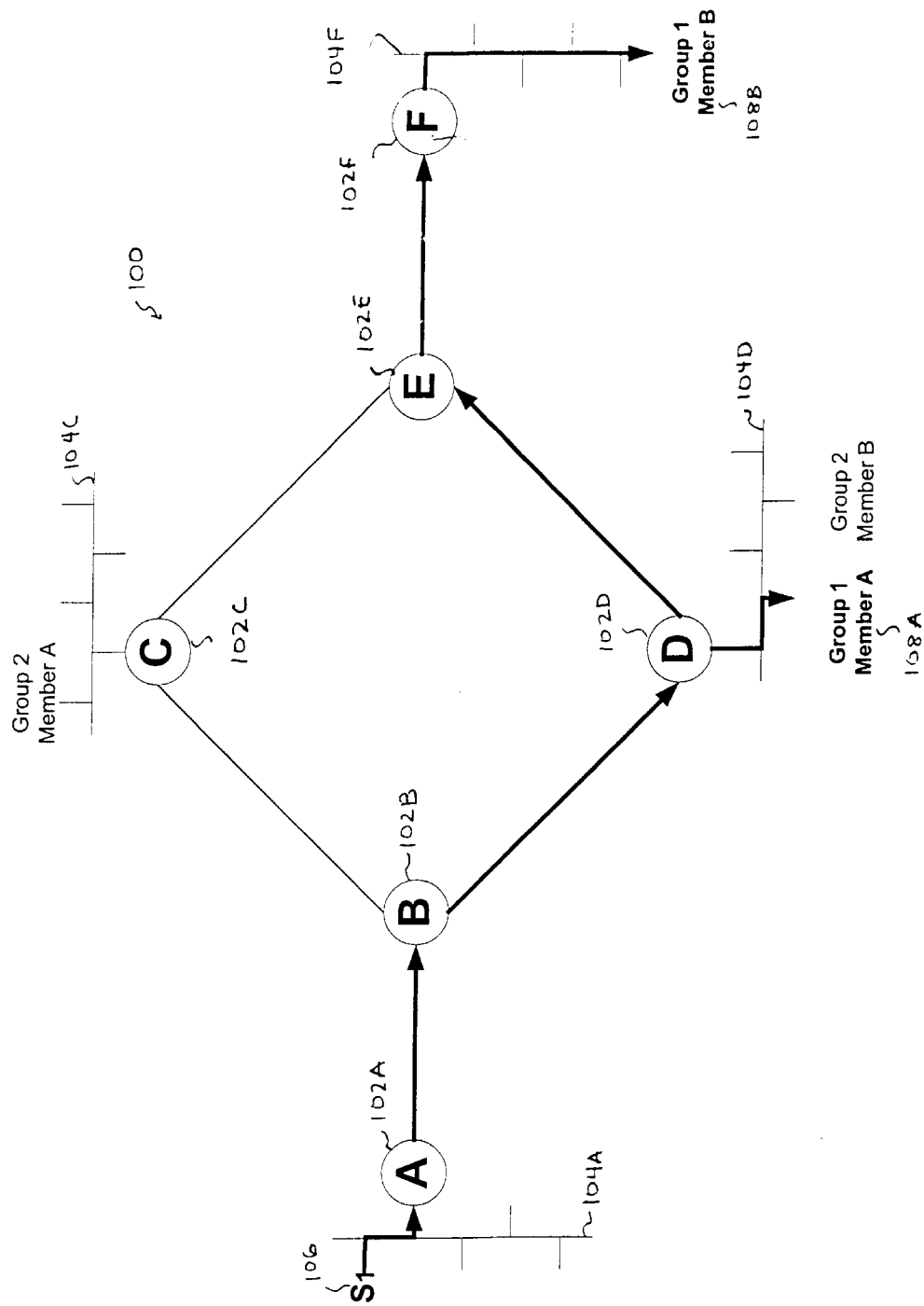
FIGS. 1 to 4 are diagrams of sources multicasting data to group members.

FIG. 1 shows a network 100 of connected routers 102a–102f. The routers 102a–102f enable devices on different sub-networks 104a–104c (e.g., Local Area Networks) to communicate though not directly connected to one another. FIG. 1 also shows members of two different multicast groups. Group "1" includes member A 108a on sub-network 104d and member B 108b on sub-network 104f. Group "2" includes member A 110a on sub-network 104c and member B 110b on sub-network 104d. FIG. 1 shows a very basic multicasting environment. However, even in this simple network, the network routers 102a–102f handle a large number of different multicasting scenarios. FIGS. 1–4 show a few scenarios that illustrate how differently the same set of routers behave depending on who is sending and who is receiving multicast data.

Figure 2:
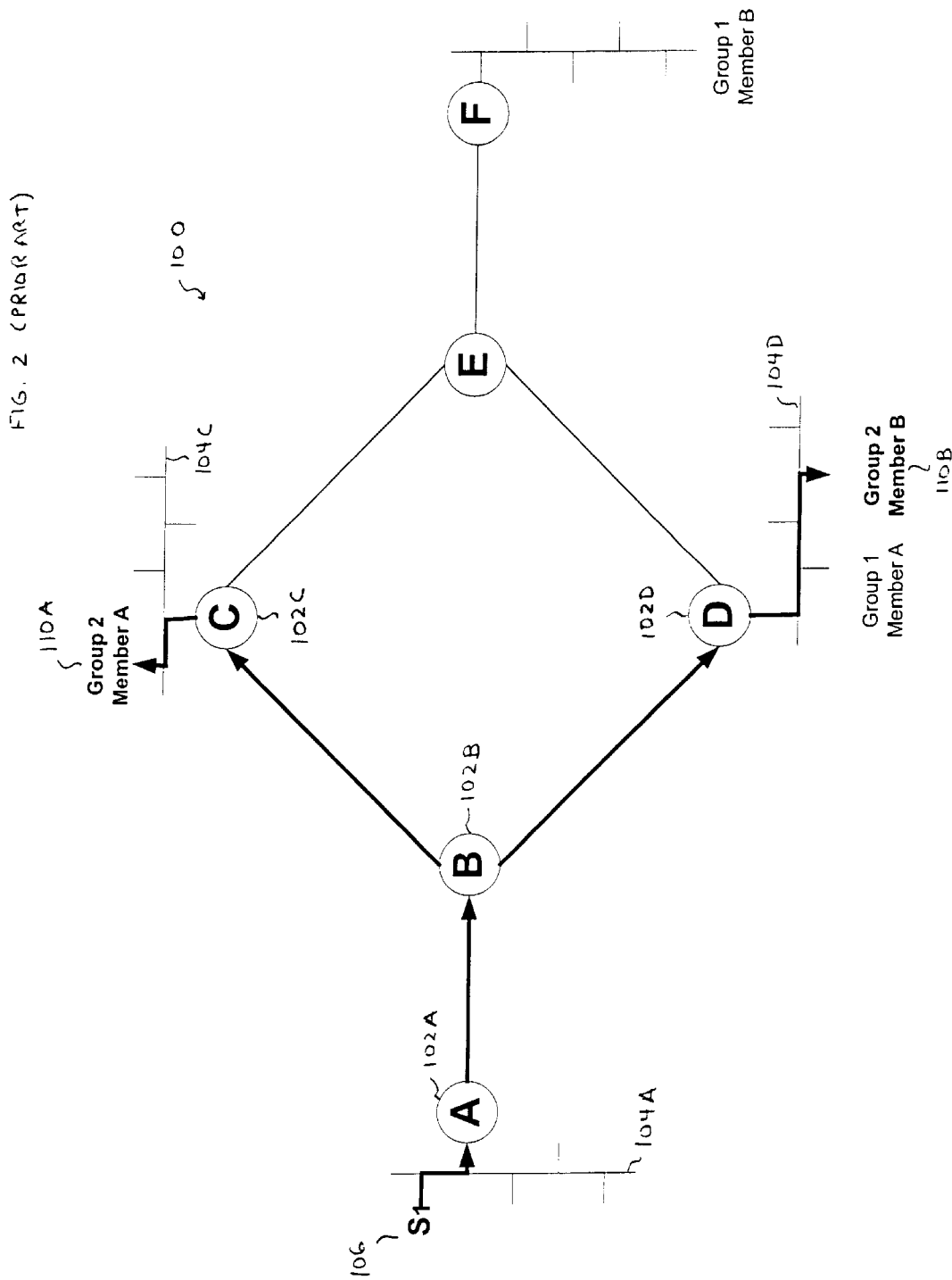
Figure 3:
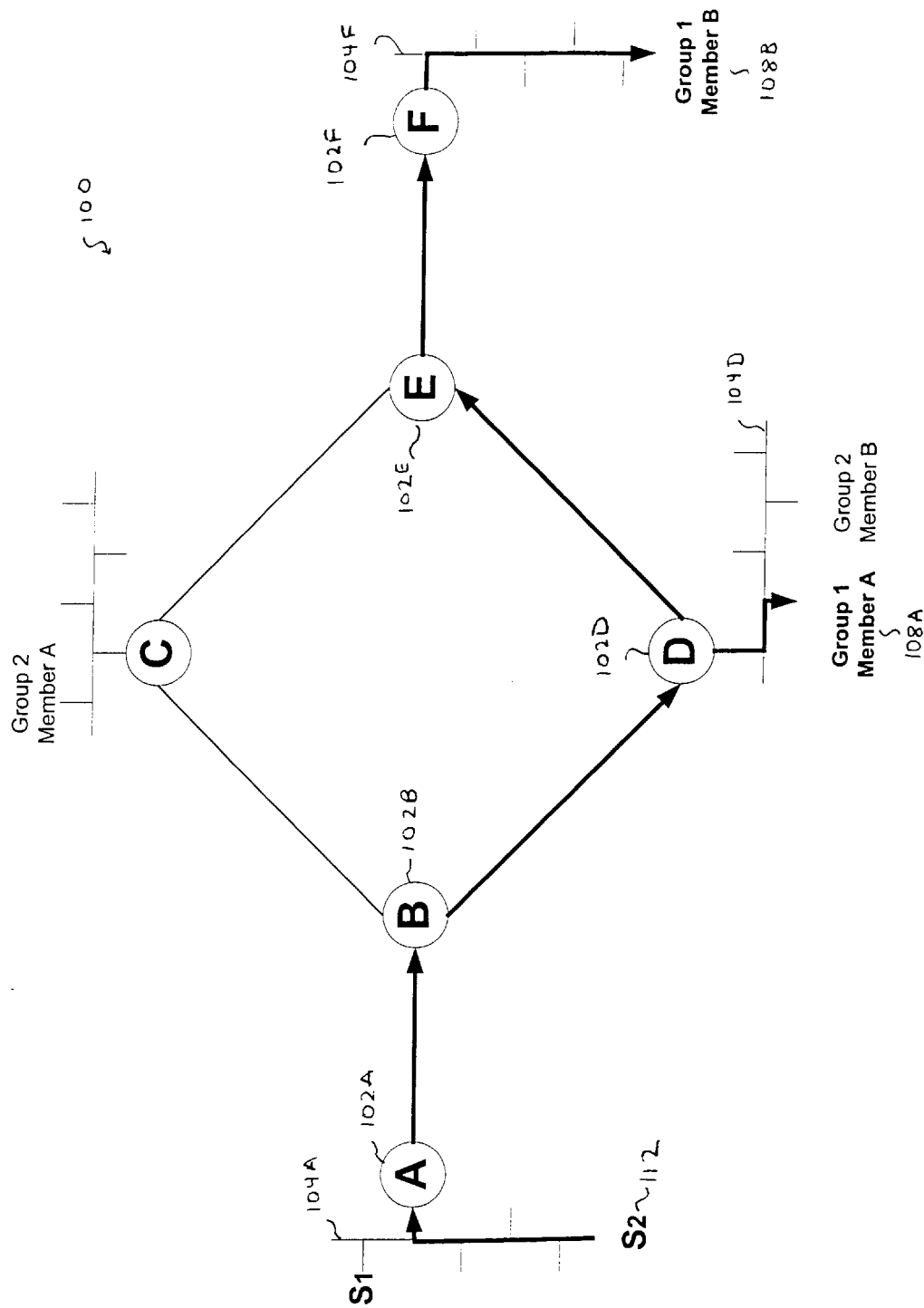
Figure 4:
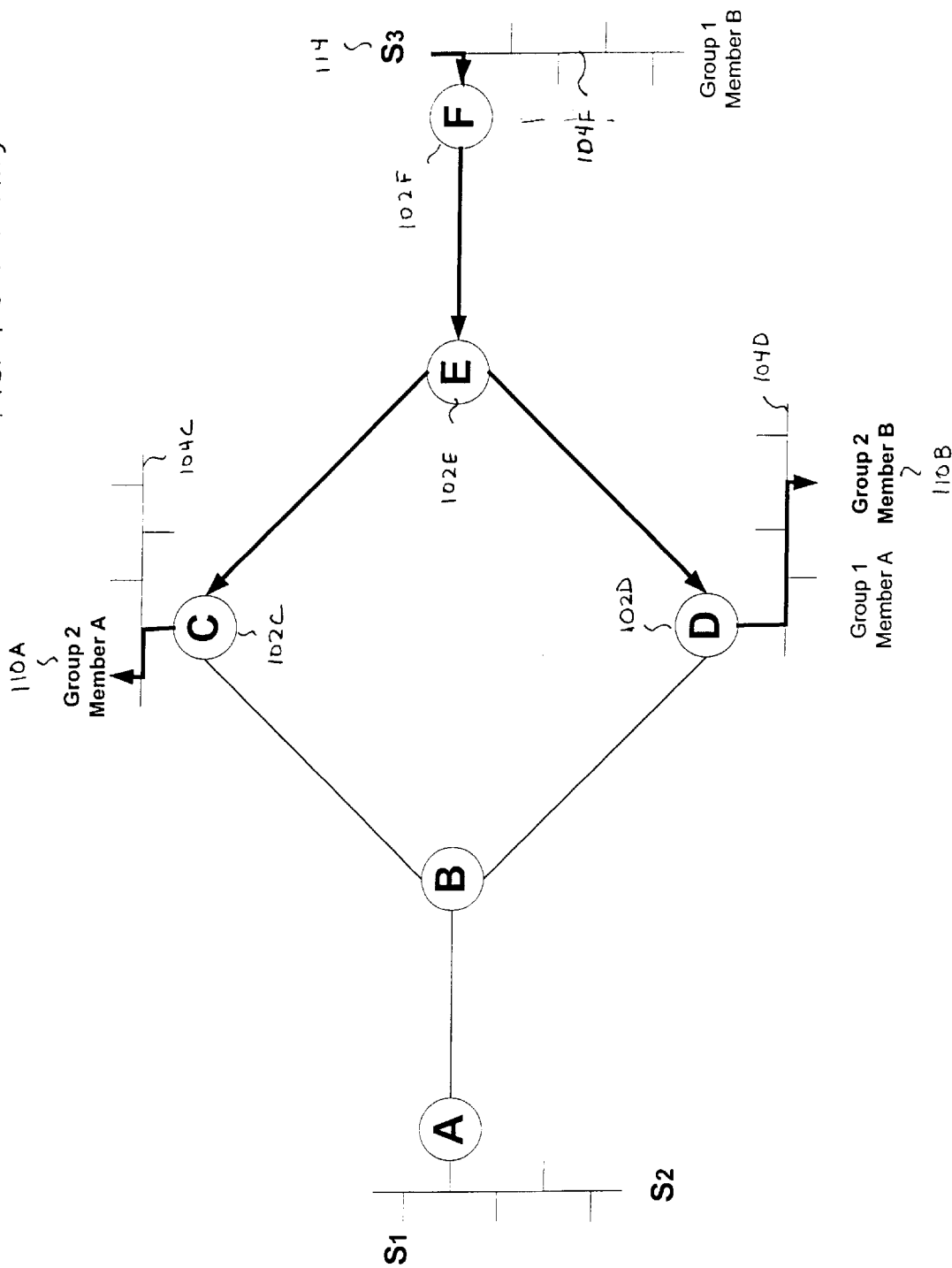

In FIG. 1, a sender S1 106 multicasts data to members 108a, 108b of Group "1". The paths of the packets are shown as bolded arrows. In FIG. 2, sender S1 106 multicasts data to members 110a, 110b of Group "2". In FIG. 3, a different sender, S2, on the same sub-network 104a as sender S1, multicasts data to members 108a and 108b of Group "1". Finally, in FIG. 4, a sender S3 on sub-network 104f multicasts data to members 110a, 110b of Group "2".

As shown in FIGS. 1–4, a router determines how to forward a packet based on the sender, receiver, and the arrangement of network routers. A multicast protocol used by a router can determine how a router makes this decision. Different protocols may use different routing algorithms and may not select the same transmission paths shown in FIGS. 1–4. However, regardless of the protocol selected and the approach the protocol takes in forwarding packets, computing a forwarding path based on a particular protocol can consume considerable router resources.

Figure 5:
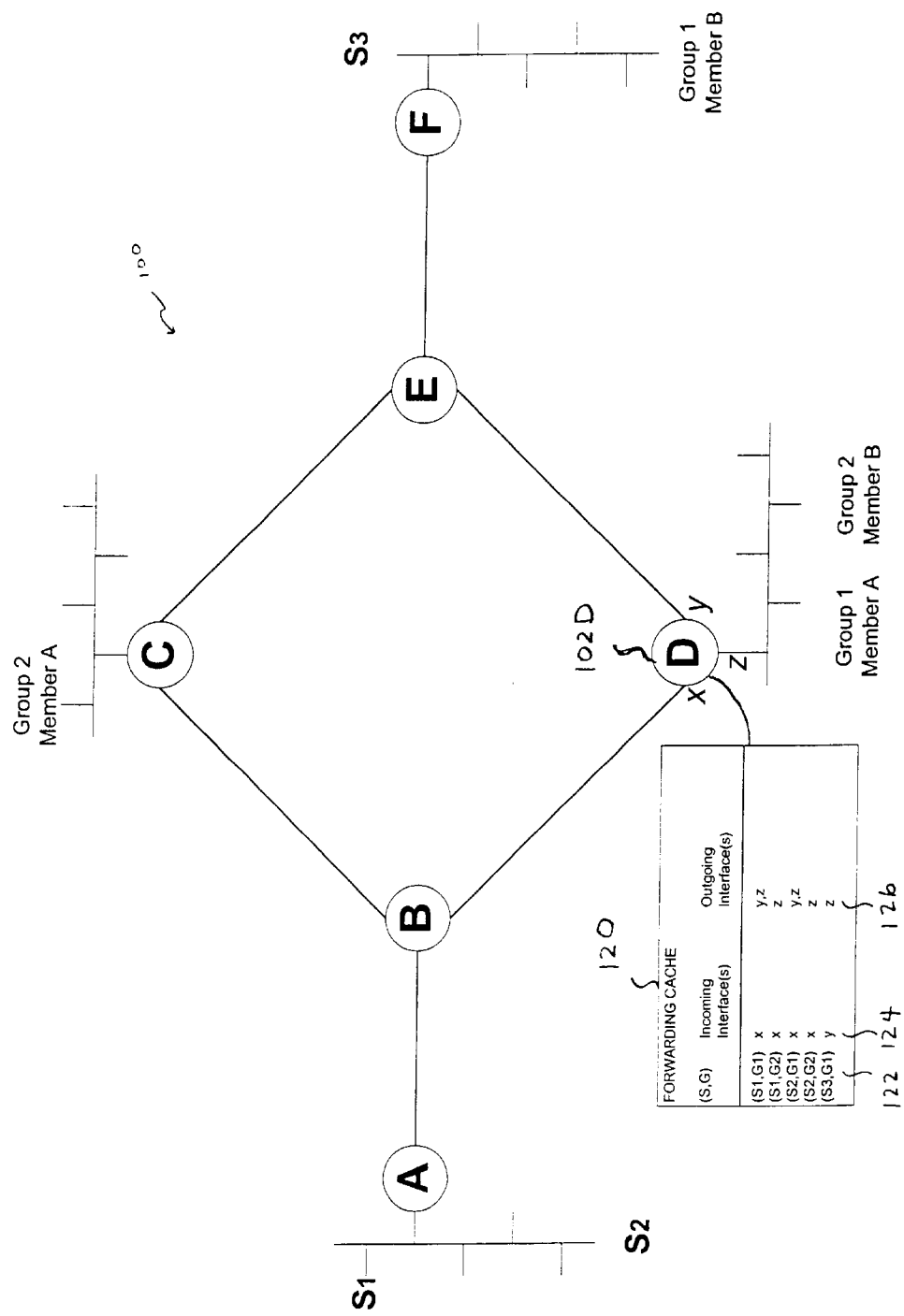
FIG. 5 is a diagram illustrating a forwarding cache.

Because multicast data typically includes a steady flow of packets from the same source to the same group (e.g., each packet may include a portion of streaming video), many routers use a forwarding cache that stores forwarding information describing how the router processed a previous packet in a flow to speed processing of subsequent packets in the flow. For example, FIG. 5 shows a forwarding cache 120 for router D 102d. As shown, router D features three different interfaces to the network 100: x, y, z. The forwarding cache 120 lists different particular source/group pairs and the interface(s) that should carry the packets for each pair. For example, the first entry in the forwarding cache 120 indicates that packets received from sender Si en route to members of group G1 (i.e., "Group 1") should be received on interface x and transmitted out over interfaces y and z. This corresponds to the behavior of router D in the scenario shown in FIG. 1. Thus, if router D receives a packet from sender S1 to members of Group 1 on interface x, the router D can quickly forward the packet out interfaces y and z without much computation. Similarly, if the (S1, G1) packet arrived from interface y instead of interface x, the router can quickly drop the packet. While the router uses a multicast protocol algorithm to determine how to forward the first packet in a flow from S1 to group G1, the router need not waste time repeating this potentially expensive determination for subsequent packets traveling the same path.

Figure 6:
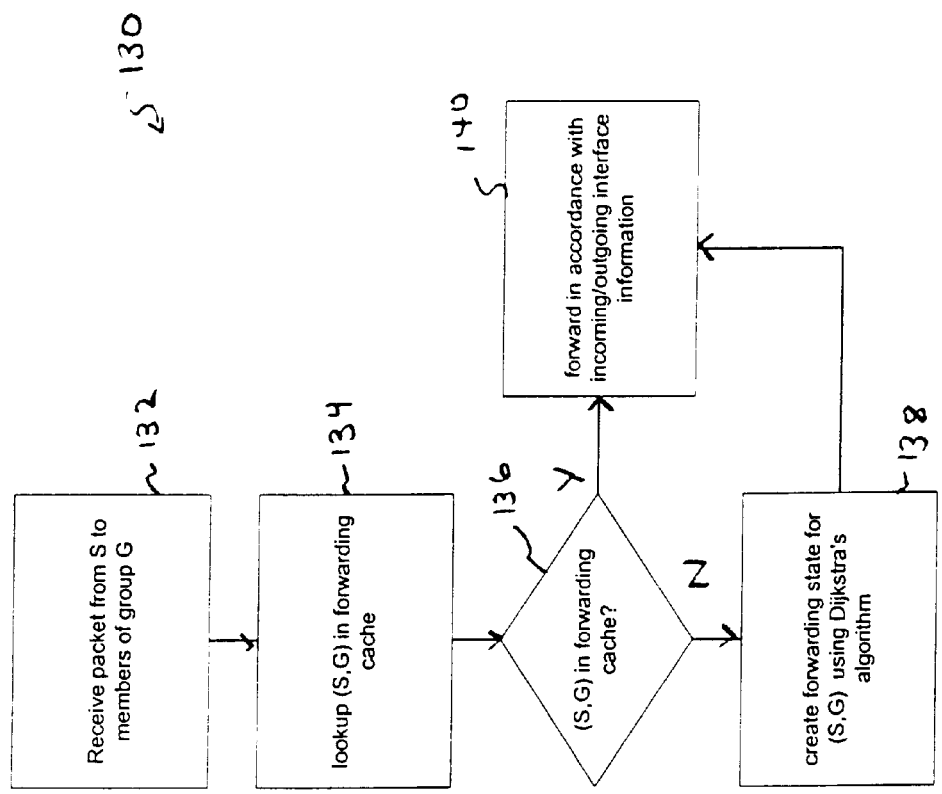
FIG. 6 is a flowchart of a process for building and using a forwarding cache.

FIG. 6 shows a process 130 a router can use to build and use a forwarding cache. When the router receives 132 a multicast packet from some source S to members of some group G, the router can lookup 134 the particular (S,G) pair in the forwarding cache. If the pair is in the cache 136, the router can quickly process 140 the packet. That is, the router can forward the packet via the outgoing interfaces associated with the (S,G) pair. If the pair is not in the cache, the process 130 uses whatever protocol technique the router's abides by to determine how to handle the packet(s). For example, MOSPF routers can use Dijkstra's short path first algorithm to determine the incoming and outgoing interface information for a particular S and a particular G. After determining the interfaces, the router can add a new forwarding cache 138 entry for the (S,G) pair. The router can use the forwarding cache to process the next packet arriving from the same S going to the same G.

The forwarding cache 120 shown in FIG. 5 includes a forwarding state for different (S,G) pairs. While this speeds packet forwarding, it does not take advantage of the similarity between multicast paths shared by different (S,G) pairs. For example, the multicast paths shown in FIGS. 1 and 3 from senders S1 and S2, respectively, to the members of Group "1" are identical from router A onward. Handling multicast data from different sources similarly can further reduce the number of times a router uses a protocol algorithm to determine multicast transmission paths. FIGS. 7 to 16 describe caching techniques that use an additional cache to "lump" different multicast sources together and reduce the number of times a multicast protocol algorithm is used determine how to process a received packet.

Figure 7:
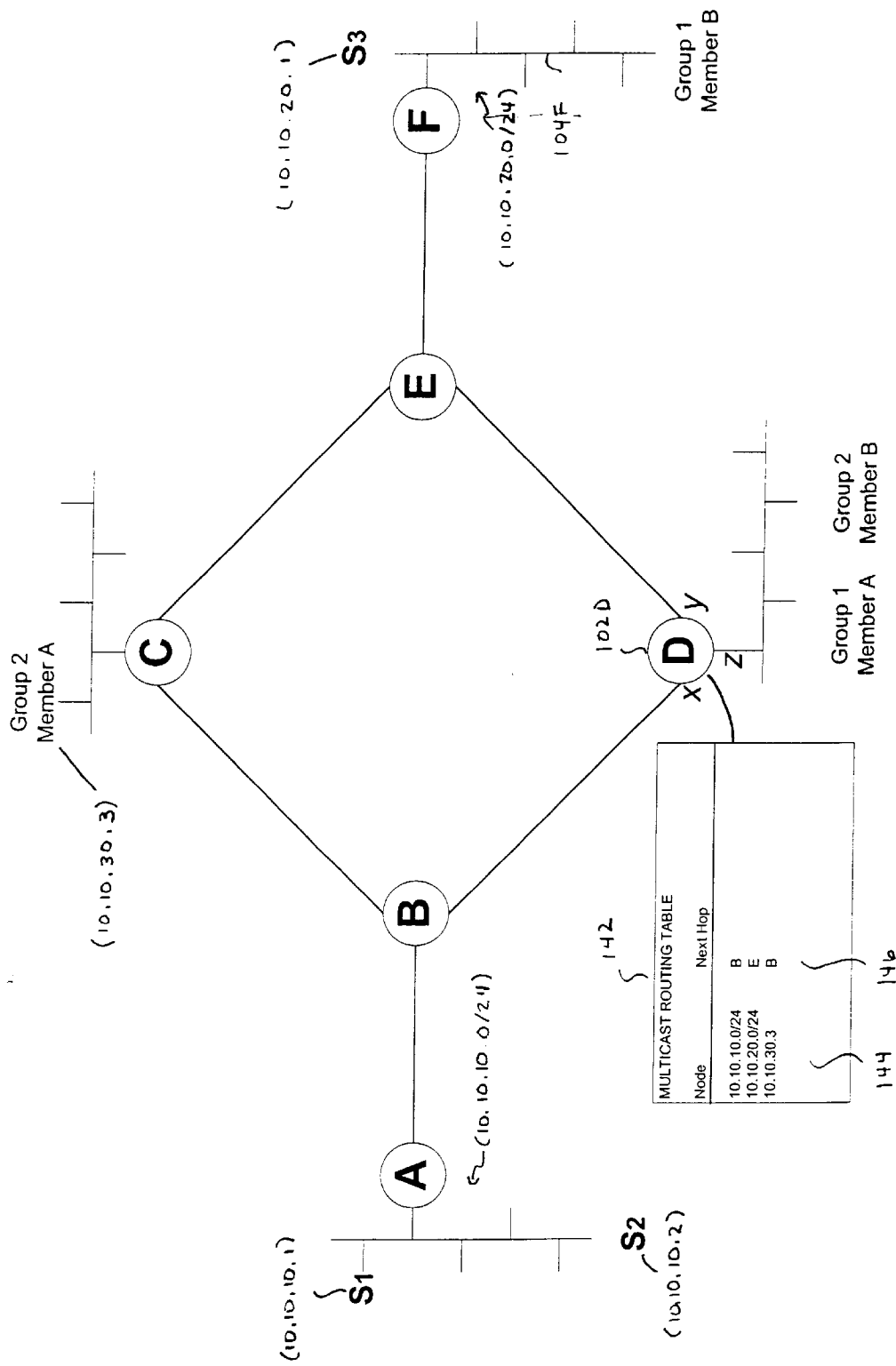
FIGS. 7 and 8 are diagrams illustrating a multicast routing table.

FIG. 7 shows different network IP (Internet Protocol) addresses and ranges of IP addresses for the network of FIGS. 1–4. IP addresses are currently 32-bits long but are commonly written as a series of four 8-bit words separated by periods (e.g., 255.255.255.255). As shown, members of a sub-network frequently share a common IP address prefix. For example, members of sub-network 104a share a prefix of 10.10.10 with the remaining word identifying the particular device on the sub-network 104a. That is, sender S1 has an IP address of 10.10.10.1 while sender S2 has an IP address of 10.10.10.2. One type of IP address notation denotes a range of IP addresses by specification of a number of prefix bits after a "/". For example, 10.10.10.0/24 corresponds to all addresses that share the first 24 bits of 10.10.10.0. That is, 10.10.10.0/24 covers addresses from 10.10.10.0 to 10.10.10.255.

FIG. 7 also shows a multicast routing table 142 that specifies the "next hop" 144 on the way to remote network devices 146. For example, to reach any device in the address range of 10.10.10.0/24, the "next hop" 144 closer to the device is router B. Co-pending U.S. application Ser. No. 09/362,521, filed Jul. 8, 1999, entitled "Multicast Routing", incorporated by reference herein, describes techniques for building a multicast routing table. However, other tables that group together different sources for common treatment may be suitably substituted for the multicast routing table described in the co-pending application.

Figure 8:
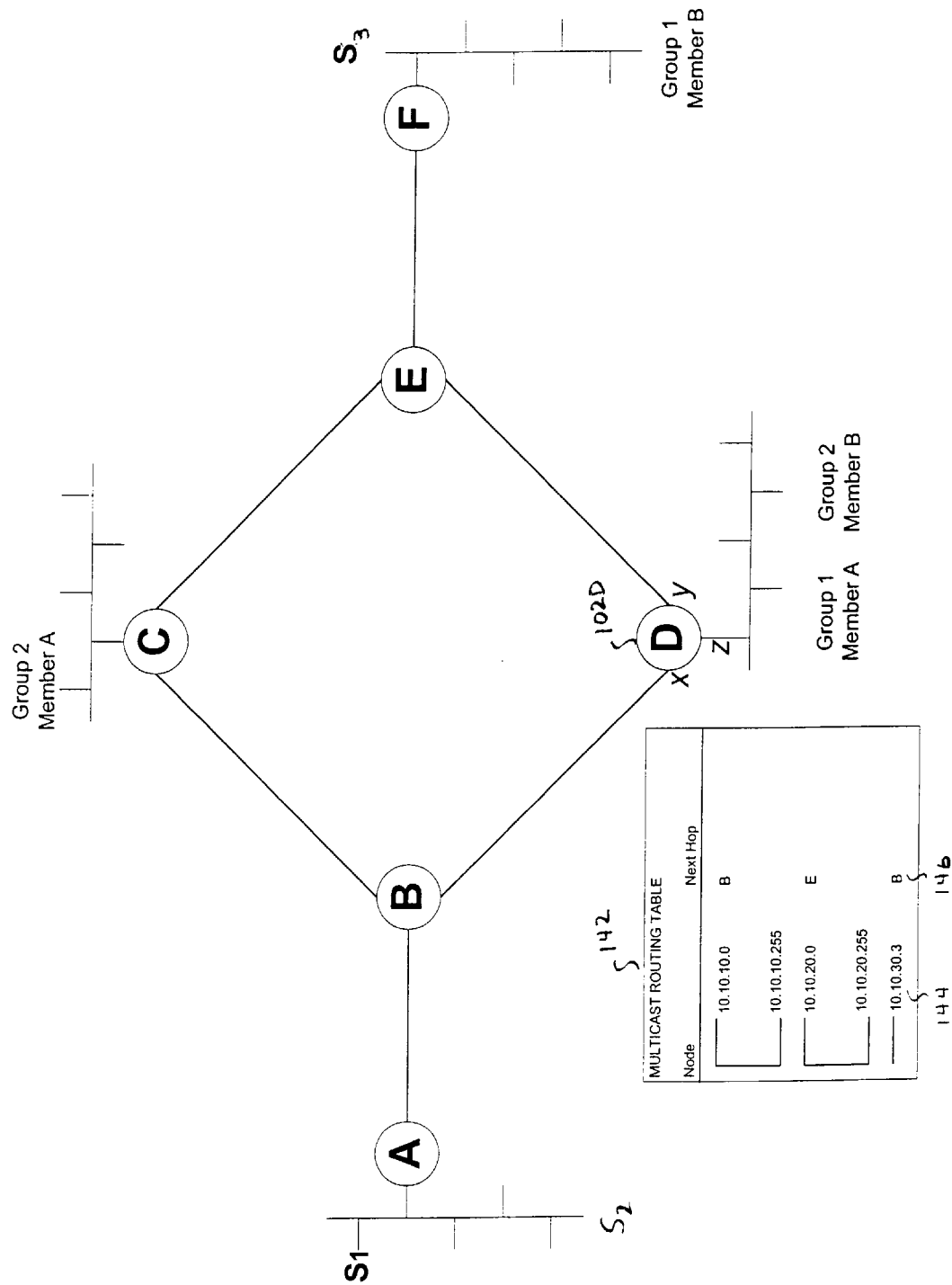
Figure 9:
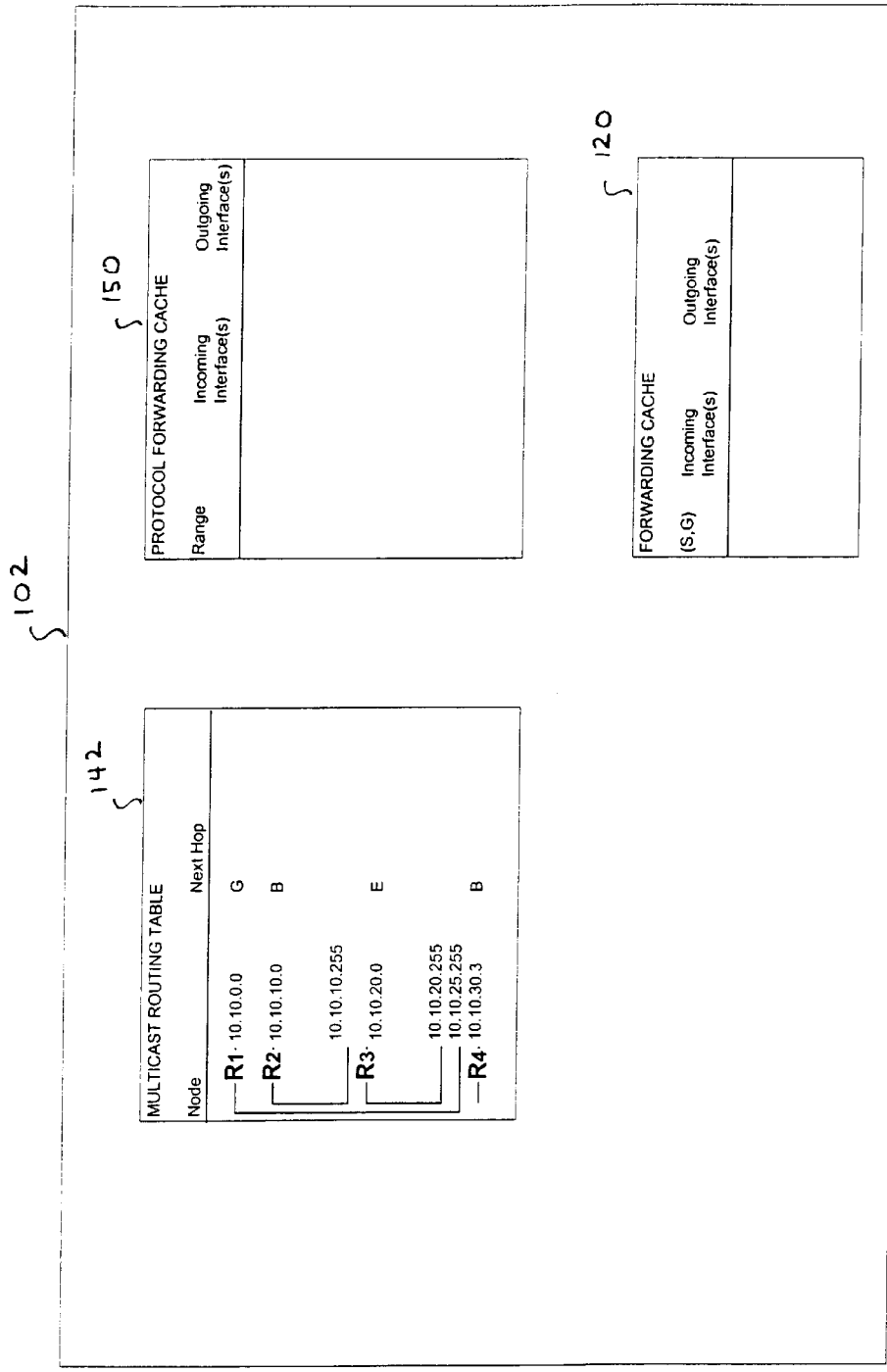
FIG. 9 is a diagram of different forwarding caches used to forward multicast packets.

FIG. 8 shows the same multicast routing table 142 of FIG. 7 in a more easily understood graphic format that will be used for the remainder of this description. Because of the small size of the network of FIGS. 1–4, the routing table of FIGS. 7 and 8 are similarly small. In a real network, however, a router will typically have entries for a very large number of network devices. Additionally, though not shown in FIGS. 7 and 8, the different address ranges may nest within one another rather than staking out exclusive address spaces. For example, FIG. 9 shows a multicast routing table 142 that includes two ranges of addresses R2 and R3 nested within range R1. The addresses corresponding to R2 and R3 thus represent exceptions to the processing of addresses in the range of R1. The address ranges may feature many different levels of nesting (e.g., a range within a range within a range).

FIG. 9 also shows different components in a multi-level caching scheme. The scheme uses the multicast routing table 142 to identify ranges of source addresses that can be handled similarly, a forwarding cache 120 to store specific (S,G) pairs and their interfaces for fast handling of received packets, and a "protocol forwarding" cache 150 that stores interfaces for the ranges of addresses described in the multicast routing table 142. The scheme enables interface information to be determined and cached for nested ranges of addresses. This enhances traditional forwarding caches by eliminating unnecessary path computation for devices within the same range of addresses.

Figure 10:
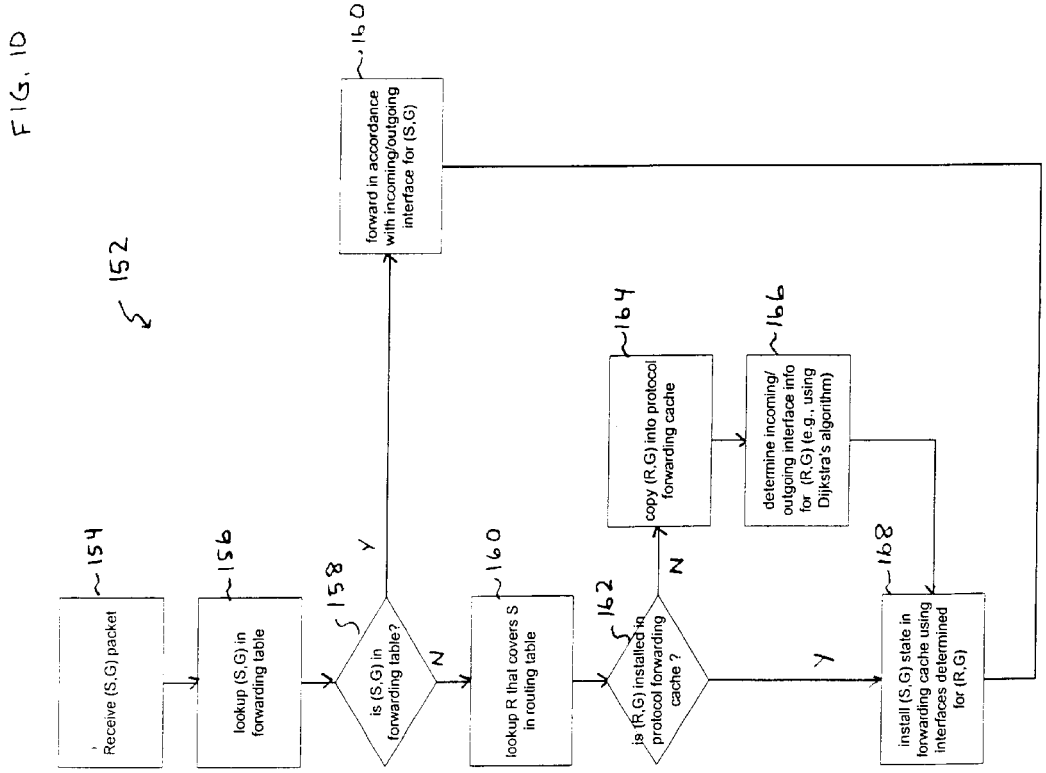
FIG. 10 is a flowchart of a process for forwarding multicast packets.

FIG. 10 shows a flowchart of a process 152 for using the protocol forwarding cache to reduce the number of path determinations made by a protocol algorithm. Similar to the process shown in FIG. 6, after receiving 154 a packet from some source S to members of some group G, the router can lookup 156 the (S,G) pair in the forwarding cache. Again, if the (S,G) pair is found, the router can use the interface information stored in the forwarding cache to quickly forward or drop the packet 160. However, if the (S,G) pair is not in the forwarding cache, instead of determining the path for the specific (S,G) pair, the router can determine whether interfaces for the most specific range covering the particular source address have already been installed in the protocol forwarding cache. Making this determination is a two-part sequence. First, the router examines 161 the multicast routing table to see which range covers the address of source S most specifically (i.e., which range is the "best-fit"). The router can then examine the protocol forwarding cache to see if this particular range of addresses (i.e., a range having the same starting and ending addresses) was previously installed for the group G. If not previously installed, the router can install 164 the range in the protocol forwarding cache and determine 166 the incoming and outgoing interfaces for the range. After the router installs the range in the protocol forwarding cache, an entry for the particular (S,G) can be installed in the forwarding cache by copying the incoming and outgoing interfaces determined for the address range covering the S. To clarify this process, FIGS. 11 to 14 illustrate how the caches interoperate when presented with a multicast packet.

Figure 11:
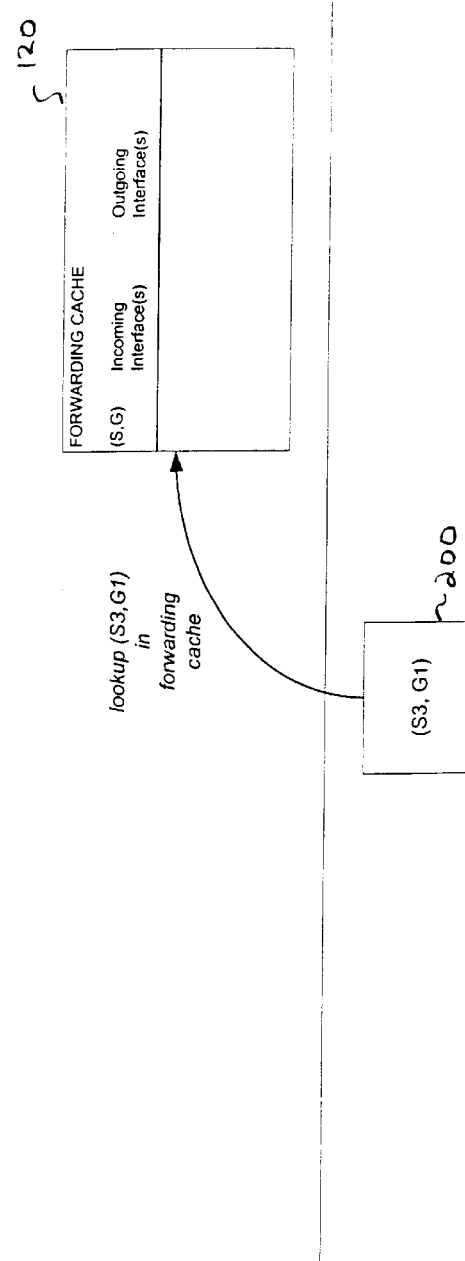
FIGS. 11 to 14 are diagrams illustrating cache building.
Figure 12:
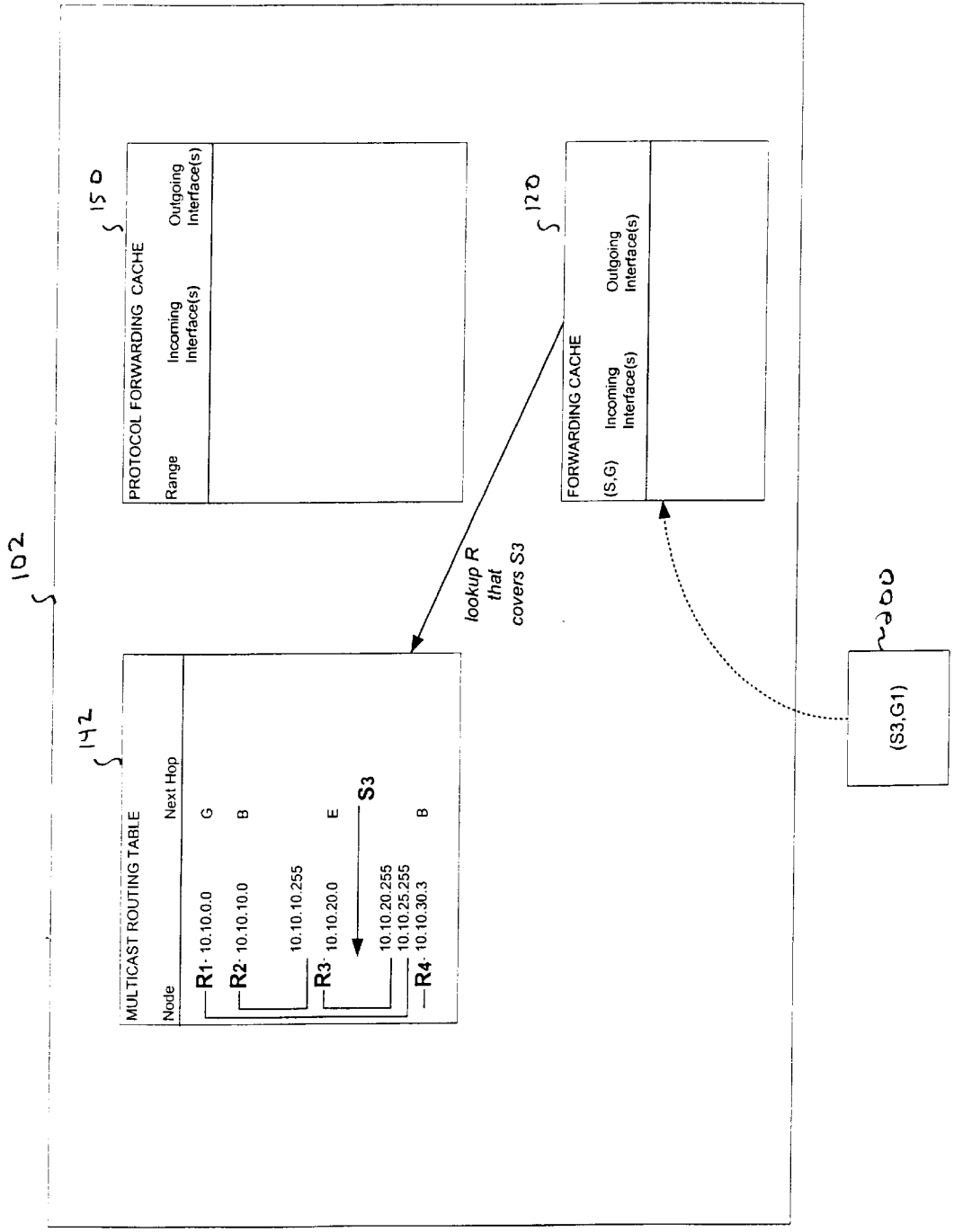

FIG. 11 shows a multicast data packet 200 sent from source S3 to the members of group "1" being received at a router 102. The router 102 looks for an entry for (S3,G1) in its forwarding cache 120. As shown, however, the forwarding cache 120 is initially empty. In other words, packet 200 is the first (S3, G1) packet received by the router 102. As shown in FIG. 12, since the forwarding cache 120 does not include an entry corresponding to packet 200, the router 102 examines the multicast routing table 142 to find the most specific range of addresses covering source S3. As shown, the smallest range of addresses covering the source S3 is the range labeled R3. R3 corresponds to the range of addresses of sub-network 104F in FIGS. 1–4.

Figure 13:
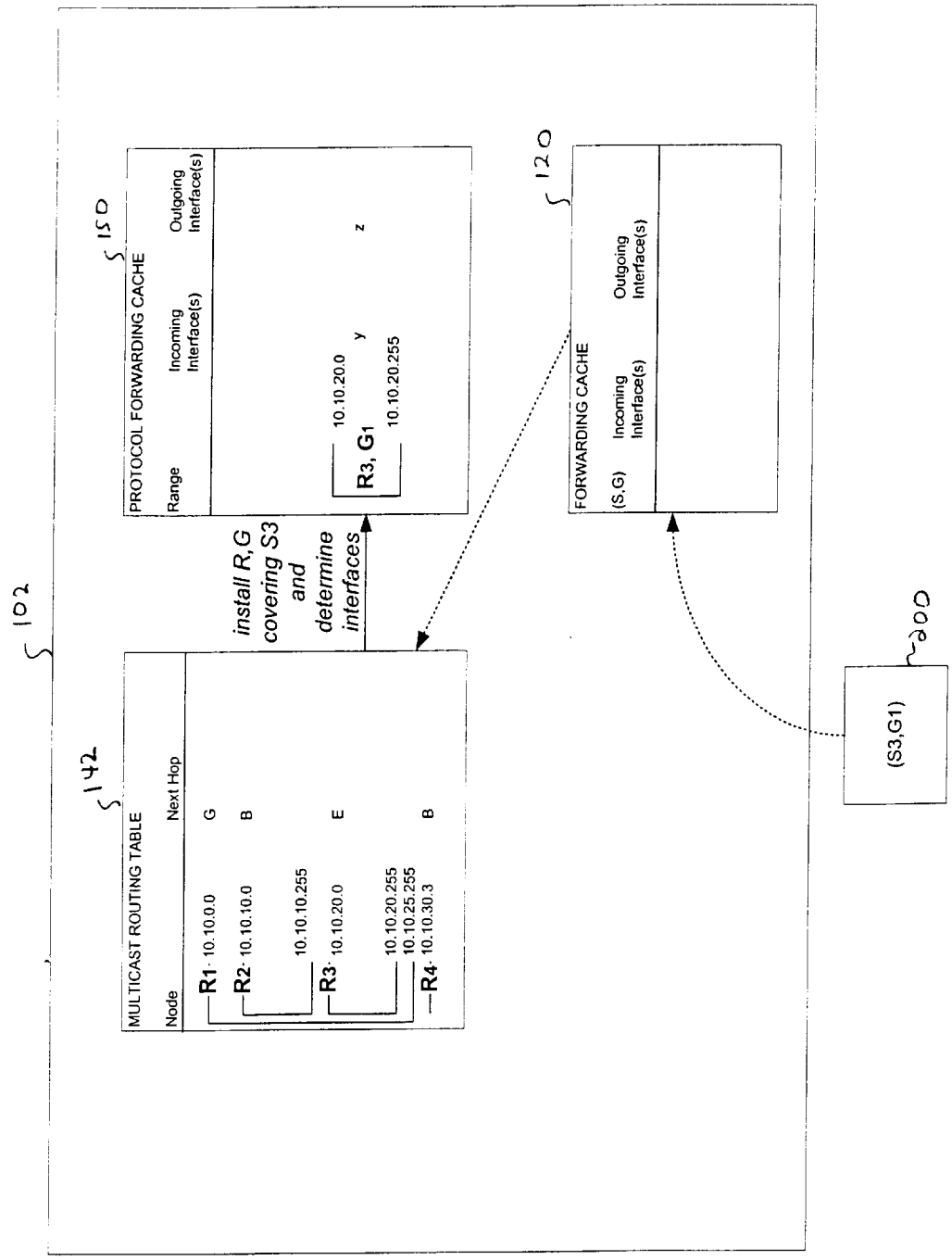
Figure 14:
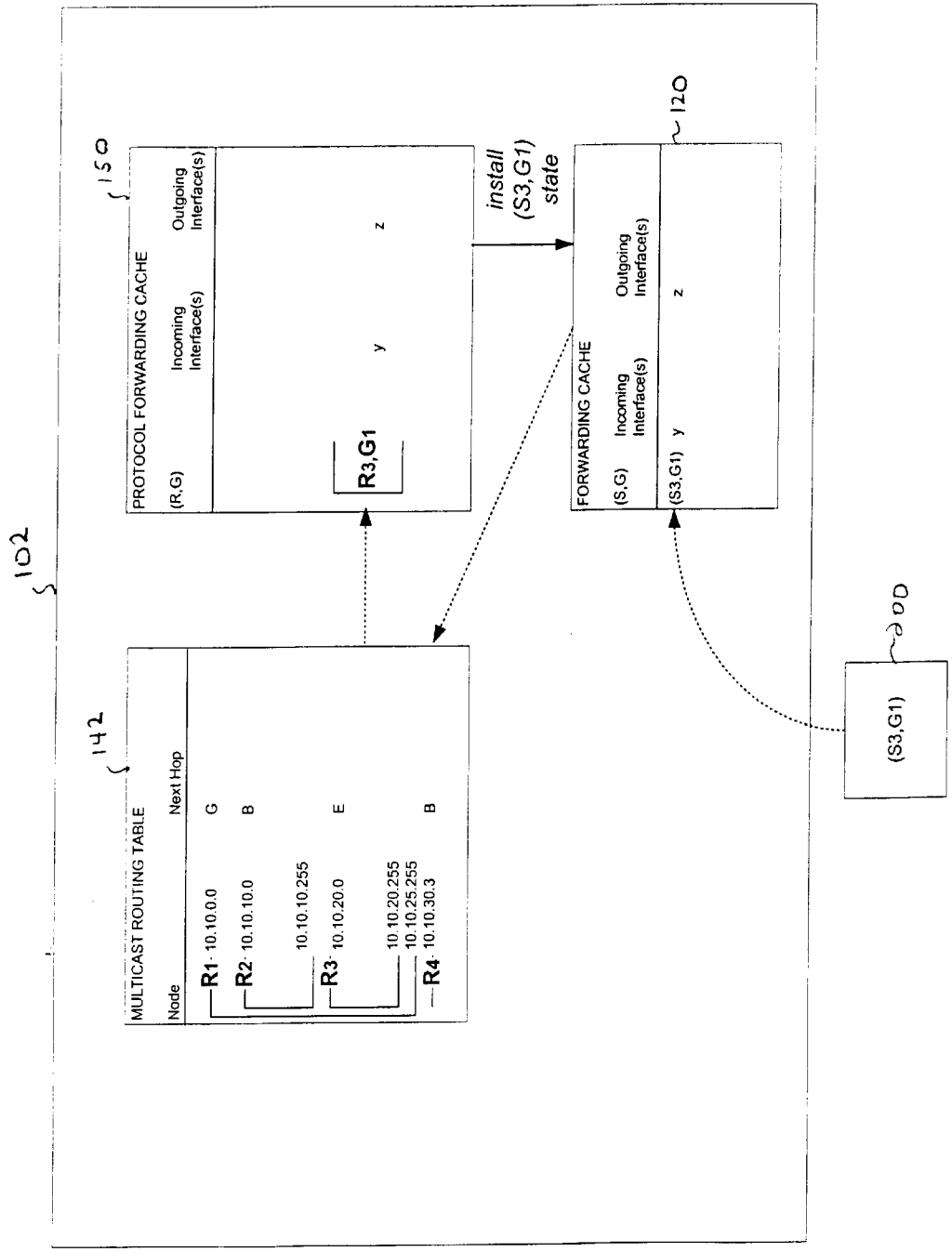

As shown in FIG. 13, since an entry for the range R3 had not been previously entered into the protocol forwarding cache for group G1, the router installs the entry and determines the incoming and outgoing interfaces for the range using whatever protocol the router is running. Finally in FIG. 14, a particular (S3, G1) state is entered into the forwarding cache and the interface information is copied from the (R3,G1) entry in the protocol forwarding cache 150.

The forwarding cache 120 now includes a state for (S3, G1). Thus, future packets from S3 to members of Group G1 can be forwarded without consulting any other table and without performing any multicast protocol path determinations. Further, the router can quickly install entries for other packets being sent to group "1" from senders in within address range R3. That is, if some other device, say S4, on sub-network 104F, decided to multicast data to Group "1", router D could quickly install an (S4,G1) entry into the forwarding cache by copying the interface information from the (R3,G1) entry in the data path cache.

Thus, the technique speeds addition of new entries into the forwarding cache by avoiding unnecessary protocol path determinations (e.g., Dijkstra's algorithm to determine incoming and outgoing interfaces). Additionally, the technique enables fast updating of the forwarding cache interface information if network conditions change. For example, if some router in the network crashes, the forwarding information in the forwarding cache 120 may need to be re-determined. Re-determining every entry in the forwarding cache may take considerable time. However, updating the interface information for each entry in the protocol forwarding cache and copying the interfaces into the appropriate entries of the forwarding cache may substantially reduce the number of re-determinations the router must perform. Additionally, since ranges are installed into the protocol forwarding cache when packets actually arrive, the size of the cache remains small.

The techniques described here are not limited to any particular hardware or software configuration; they may find applicability in any computing or processing environment. The techniques may be applied for use in a wide variety of multicasting environment using different multicast protocols. The techniques may be implemented in hardware or software, or a combination of the two. Preferably, the techniques are implemented in computer programs executing on programmable computers that each include a processor, a storage medium readable by the processor (including volatile and non-volatile memory and/or storage elements), at least one input device, and one or more output devices. Program code is applied to data entered using the input device to perform the functions described and to generate output information. The output information is applied to one or more output devices.

Each program can be implemented in a high level procedural or object oriented programming language to communicate with a computer system. The programs can also be implemented in assembly or machine language, if desired. In any case, the language may be a compiled or interpreted language.

Each such computer program is preferable stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other embodiments are within the scope of the following claims.

What is claimed is:

1. A method or processing a multicast packer being sent from a
multicast source address to members of a multicast group, the method comprising:
   forwarding the multicast packet to an interface indicated in a forwarding cache entry associated with the multicast source address of the packet, the interface being pre-calculated according to a routing protocol;
   responsive to a determination that the forwarding cache does not include an entry associated with the multicast source address, determining whether a protocol cache that stores interface information for ranges of addresses includes an entry for a range of addresses that includes the multicast source address;
   if the protocol cache includes the entry, adding the interface information indicated in the entry to forwarding cache for the specific multicast source address and multicast group of the multicast packet.

2. The method of claim 1, further comprising adding an interface entry in the protocol cache for the range of addresses that includes the multicast source address of the packet upon a determination that the protocol cache does not include the entry.

3. The method of claim 2, wherein the step of adding comprises using a multicast protocol routing algorithm to determine the interface entry for the range of address.

4. The method of claim 3, wherein the multicast protocol comprises one of the following: MOSPF (Multicast Open Short Path First), DVMRP (Distance Vector Multicast Routing Protocol), and PIM-DM (Protocol Independent Multicasting—Dense Mode).

5. The method of claim 2, wherein the step of adding an interface entry in the protocol cache comprises determining a range of source addresses in a table of multicast source addresses that include the multicast source address of the packet.

6. The method of claim 5, wherein the range of source addresses comprises a most specific range of source addresses including the multicast source address of the packet.

7. The method of claim 1, wherein the multicast source address comprises an Internet Protocol (IP) address.

8. The method of claim 1, wherein the address ranges of the protocol cache comprise nested address ranges.

9. A method of updating a first entry in a forwarding cache that stores forwarding information for multicast source address, multicast group pairs, in response to receipt of a multicast packet having a multicast source address, multicast group address pair with no corresponding entry in the forwarding cache, the method comprising:
   selecting a second entry in a protocol cache that stores forwarding information for ranges of multicast source addresses, the range of addresses of the selected second entry including the multicast source address; and
   replacing the forwarding information for the first entry in the forwarding cache with forwarding information associated with the selected second entry in the protocol cache.

10. The method of claim 9, wherein the forwarding information comprises identification of one or more outgoing interfaces and one or more incoming interfaces.

11. The method of claim 9, further comprising determining forwarding information for the entries in the protocol cache using a multicast protocol routing algorithm.

12. A router having a memory that stores one or more data structures for use in routing multicast network packets from a multicast source to a multicast group, comprising:
   a forwarding cache that stores forwarding information for particular ranges of multicast source addresses associated with different groups;
   a protocol forwarding cache that stores forwarding information for nested ranges of multicast source addresses; and
   means for accessing the protocol cache to retrieve forwarding information for a multicast source addresses associated with a group, when forwarding information for a range of multicast source addresses associated with the group is not stored in the forwarding cache.

13. The memory of claim 12 wherein the forwarding information comprises at least one incoming interface and at least one outgoing interface associated with a range of addresses.

14. A computer program product, disposed on a computer readable medium, for processing a multicast packet being sent from a multicast source address to members of a multicast group, the program comprising instructions for causing a processor to:
   determine whether a protocol cache that stores forwarding information for ranges of multicast source addresses includes a first entry for a range of multicast source addresses that includes the multicast source address; and
   if the protocol cache includes the first entry, add an entry to a forwarding cache for the specific multicast source address and group of the packet using the forwarding information associated with the first forwarding cache entry.

15. The computer program of claim 14, further including instructions that cause a processor to add an entry in the protocol cache for a range of multicast source addresses that includes the multicast source address of the packet.

16. The computer program of claim 15, wherein the instructions that cause the processor to add an entry in the protocol cache comprise instructions that cause the processor to use a multicast protocol routing algorithm to determine forwarding information for the range of multicast source address.

17. The computer program of claim 15, wherein the instructions that cause a processor to add an entry in the protocol cache comprise instruction that cause a processor to determine a range of multicast source addresses in a table of multicast source addresses that include the multicast source address of the packet.

18. The computer program of claim 14, wherein the address ranges of the protocol comprise nested address ranges.

19. A computer program product, disposed on a computer readable medium, for updating an entry in a forwarding cache that stores forwarding information for multicast source address, multicast group pairs, in repsonse to receipt of a mulitcast packet having a multicast source address, mulitcast group address pair with no corresponding entry in the forwarding cache, the program comprising instructions for causing a processor to:

select an interface entry in a protocol cache that stores forwarding information for ranges of multicast source addresses, the range of multicast source addresses of the selected interface entry including the multicast source address; and replace the forwarding information for the entry in the forwarding cache with forwarding information associated with the interface entry in the protocol cache.

20. A system for processing a multicast packet being sent from a multicast source address to members of a multicast group, the system comprising:

means for determining whether a protocol cache that stores interface information for ranges of multicast source addresses includes an interface entry for a range of multicast source addresses that includes the multicast source address; and means for updating a forwarding cache by adding an entry for the specific multicast source address and multicast group of the packet using the interface information from the protocol cache if the protocol cache includes the interface entry, and otherwise calculating an interface for the multicast source address, and updating the protocol and forwarding cache with the calculated interface.

\* \* \* \* \*